March 11, 1952 — J. DWYER — 2,588,503
BALANCED LOAD WHEELBARROW
Filed March 25, 1949 — 2 SHEETS—SHEET 1
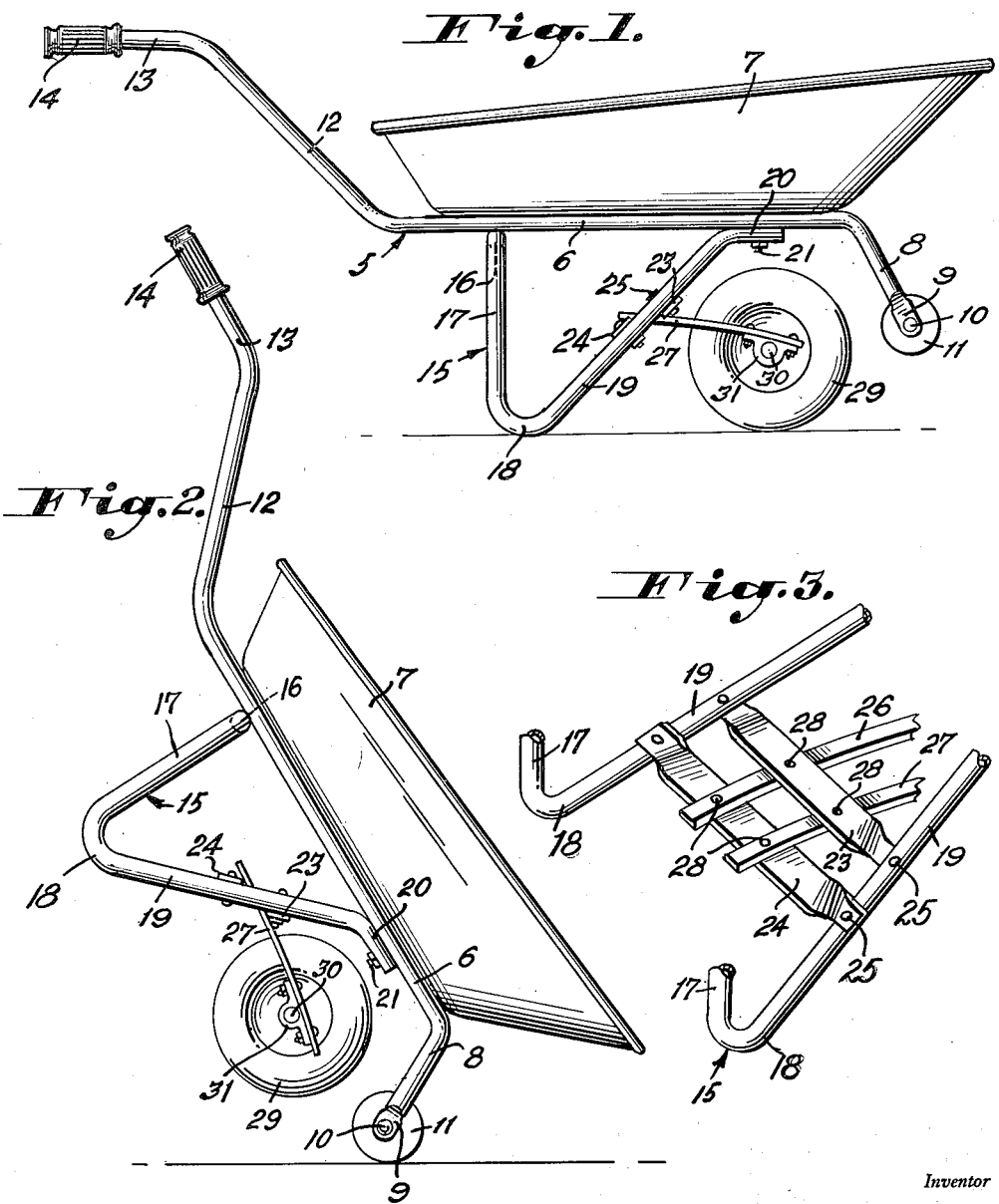
Inventor
James Dwyer
By Patrick D. Beavers
Attorney March 11, 1952 J. DWYER 2,588,503
BALANCED LOAD WHEELBARROW
Filed March 25, 1949 2 SHEETS—SHEET 2
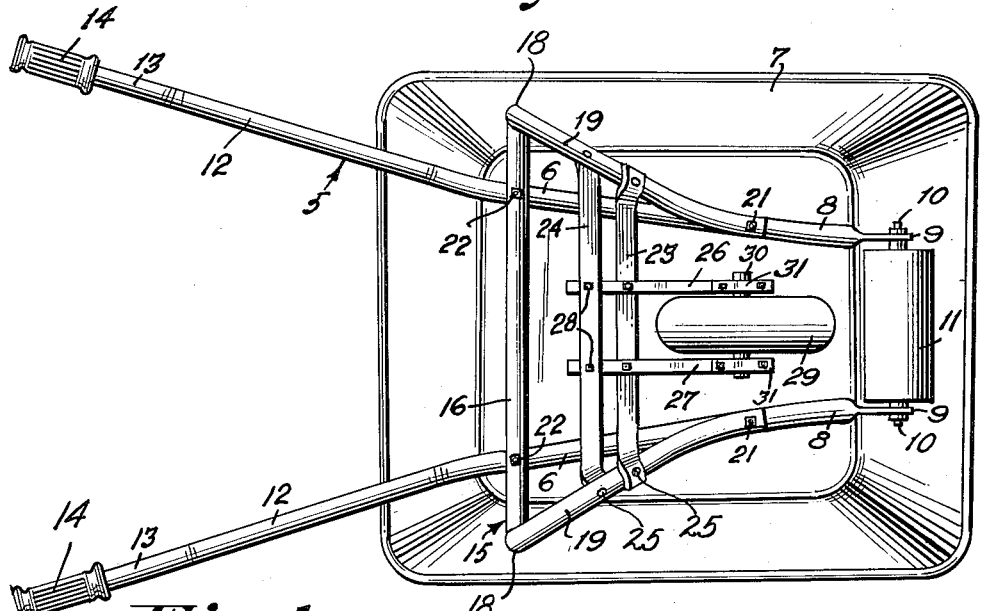
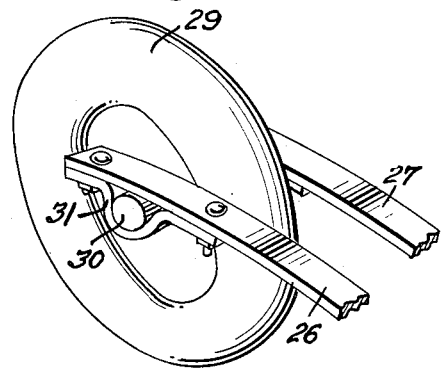
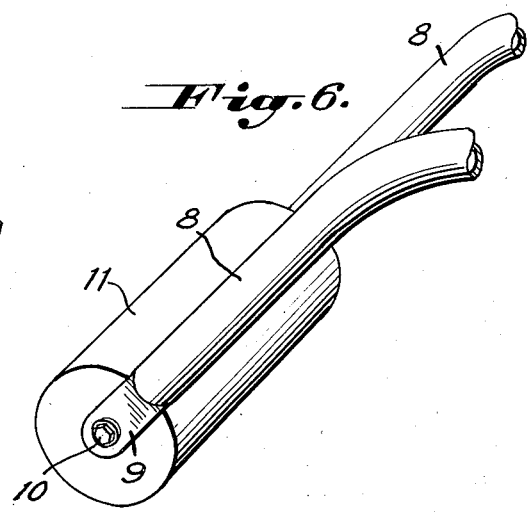
Inventor
James Dwyer
By Patrick D. Beavers
Attorney Patented Mar. 11, 1952

2,588,503

UNITED STATES PATENT OFFICE 2,588,503

BALANCED LOAD WHEELBARROW

James Dwyer, Colorado Springs, Colo.

Application March 25, 1949, Serial No. 83,500

1 Claim. (Cl. 280—52)

The present invention appertains to improvements in wheeled conveyors and more particularly to a balanced load wheelbarrow.

The principal object of the present invention is to provide a wheelbarrow construction wherein the wheel is situated under the load pan and at a position most contributory to balancing the load while being manually wheeled.

Another object of the invention is to provide a wheelbarrow wherein the load imposed upon the usual wheelbarrow pan is substantially balanced upon the carrier wheel when the wheelbarrow is being moved, and wherein spring carrier means for the wheel are provided to absorb shock when pushing the wheelbarrow over uneven ground.

Still another object of the invention is to provide a wheelbarrow of the character stated which will have the above and other advantages and which can be manufactured for substantially the same cost as the present day high quality wheelbarrows.

In the drawings:

Figure 1 is a side elevational view of the wheelbarrow at rest.

Figure 2 is a side elevational view of the wheelbarrow in dumping position.

Figure 3 is a fragmentary perspective view of the leg and spring structures.

Figure 4 is a bottom plan view of the wheelbarrow.

Figure 5 is a fragmentary perspective view showing the wheel and spring carrier means.

Figure 6 is a fragmentary perspective view of the dumping roll.

Referring to the drawings wherein like numerals designate like parts, it can be seen that numerals 5 denote a pair of elongated tubes which converge forwardly as shown in Figure 4 and which have straight portions 6, upon which a load carrying pan 7 is secured, the forward ends of the tubes 5 slanting downwardly under the forward deep end portion of the pan 7, as at 8 and having their terminal portions flattened as at 9 and apertured to receive axial structures 10 projecting from the ends of a dumping roll 11, the function of which will be described later.

Rearwardly of the straight portions 6, the tubes 5 slant upwardly as at 12 and then rearwardly as at 13, these portions 13 carrying hand grips 14 of rubber or other suitable material.

A leg structure generally referred to by numeral 15 consists of a third tubular member to form first, a transverse straight portion 16 (see Figure 4), from the ends of the straight portion 16 the tube depends as at 17 to ground-engaging heel portions 18 from where the tube ends slant upwardly and forwardly as at 19 and then horizontally as at 20, the horizontal portions 20 being secured by bolts 21 to the straight portions 6 of the elongated tubes 5, just rearwardly of the sloping portions 8. As can be seen in Figure 4, the end portions of the straight part 16 of the leg formed tube are secured by bolts and nuts 22 to the rear end portions of the straight portions 6 of the tubes 5.

A pair of metallic strap members 23, 24 are secured to the portions 19 of the leg structure 15. These straps bridge the portion 19, the strap 23 being secured by bolts 25 to the front side portions of the portions 19, while the strap 24 is secured to the rear side portions of the portions 19 of the leg structure 15.

As can be seen in Figure 4 and also in Figure 3, the portions of the straps inwardly of the ends thereof are twisted so as to be on parallel planes but in all said relation to each other and a pair of spring bars 26, 27 have their rear ends disposed between the bars 23, 24 and disposed so that they will be under the upper bar 23 and upon the lower bar 24, in which positions these spring strips 26, 27 are secured by rivets, bolts or the like at 28.

A load supporting wheel 29 has an axle structure 30, the end portions of which are disposed into bearings 31 which in turn, are secured to the forward ends of the springs 26, 27. The springs are sufficiently long so as to position the wheel 29 directly under the deep portion of the wheelbarrow pan 7, so that when the wheelbarrow is lifted and moved the load will be almost precisely balanced over the wheel 29, and thus very little load will be on the handle ends 13 of the tubes 5.

Thus in using the wheelbarrow, it can be plainly seen that with the load almost precisely balanced over the wheel 29, the wheelbarrow will be easier to move and there will be less load on the handle end 13, while at the same time the springs 26, 27 will absorb any shock imparted to the load supporting wheel 29 as the wheelbarrow is pushed over uneven ground.

When the wheelbarrow has reached the dumping site, it is only necessary to tilt the wheelbarrow forwardly so that the load begins to slide out of the pan 7 as the roll 11 rests upon the ground, supporting the entire assembly and as the load slides out of the wheelbarrow pan 7 it will have a tendency to force the wheelbarrow backward and this will be accomplished easily by the rolling action of the roll 11, thus doing away with the manual exertion now necessary in stepping wheelbarrow backward as the load is being dumped from the pan.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

In a wheelbarrow including a load carrying pan and a carrier wheel, said carrier wheel being mounted under the pan at approximately the center of gravity of the pan when loaded to the brim, a frame structure under the pan and secured thereto, a leg structure secured to said pan and comprising two laterally spaced depending members secured to the frame structure and means secured to the leg structure and carrying said wheel, said means consisting of a pair of spring members projecting forwardly from said leg structure and between which the wheel is mounted, and attaching means securing said spring members to the leg structure, said attaching members consisting of a pair of vertically spaced bars bridging the depending members of said leg structure and having medial portions twisted to parallel planes with the spring members interposed between said twisted portions and being secured thereto.

JAMES DWYER.

REFERENCES CITED

The following references are of record in the file of this patent:

UNITED STATES PATENTS

| Number | Name | Date |
|---|---|---|
| 239,330 | Hunt | Mar. 29, 1881 |
| 556,616 | Carmichael | Mar. 17, 1896 |
| 597,337 | Stouffer | Jan. 11, 1898 |
| 1,095,145 | Elterich | Apr. 28, 1914 |
| 1,377,946 | Van Etten | May 10, 1921 |
| 1,951,477 | Gannett | Mar. 20, 1934 |
| 2,176,780 | Wood | Oct. 17, 1939 |
| 2,242,171 | Boyle | May 13, 1941 |
| 2,393,807 | Pinion et al. | Jan. 29, 1946 |

FOREIGN PATENTS

| Number | Country | Date |
|---|---|---|
| 783,513 | France | Apr. 8, 1935 |
| 786,150 | France | June 3, 1935 |
| 886,929 | France | July 19, 1943 |